(12) United States Patent
Throndsen et al.

(10) Patent No.: US 6,935,273 B2
(45) Date of Patent: Aug. 30, 2005

(54) BEDDING FOR LIVESTOCK

(75) Inventors: Dean R. Throndsen, Reedsburg, WI (US); Kenneth T. D'Angelo, Stone Mountain, GA (US)

(73) Assignee: Advance Comfort Technology LLC, Reedsburg, WI (US)

( * ) Notice: Subject to any disclaimer, the term of this patent is extended or adjusted under 35 U.S.C. 154(b) by 0 days.

(21) Appl. No.: 10/682,270

(22) Filed: Oct. 9, 2003

(65) Prior Publication Data

US 2005/0076855 A1 Apr. 14, 2005

(51) Int. Cl.$^7$ .................. A01K 31/00; A01K 1/015; A47C 20/02; A47C 16/00; B68G 5/00
(52) U.S. Cl. .................. 119/431; 119/525; 119/526; 5/655; 5/654; 5/420; 5/710; 5/655.5; 5/711; 5/712
(58) Field of Search ................. 119/431, 526, 119/28.5, 525, 19, 171; 5/420, 932, 711–712, 655.5, 654, 671, 706, 665, 644, 655

(56) References Cited

U.S. PATENT DOCUMENTS

| | | | | |
|---|---|---|---|---|
| 2,465,268 A | * | 3/1949 | Rogers et al. | 5/711 |
| 3,426,891 A | * | 2/1969 | Marks | 410/119 |
| 3,503,084 A | * | 3/1970 | Meinwieser | 5/630 |
| 3,533,095 A | | 10/1970 | Collins | |
| 3,583,008 A | * | 6/1971 | Edwards | 5/655.3 |
| 3,983,587 A | * | 10/1976 | Gorran | 5/654 |
| 4,065,819 A | | 1/1978 | Gorran | |
| 4,076,872 A | * | 2/1978 | Lewicki et al. | 428/12 |
| 4,121,310 A | | 10/1978 | Gorran | |

(Continued)

FOREIGN PATENT DOCUMENTS

| | | | |
|---|---|---|---|
| AU | 20088/70 | 3/1972 | |
| BR | PI9504593-7 | 4/1996 | |
| EP | 0118139 | 5/1986 | |
| EP | 0900001 | 3/1999 | |
| FR | 2672966 | 8/1992 | |
| FR | 2690046 | 10/1993 | |
| NL | 9201643 | 4/1994 | |
| WO | WO 85/04550 | 10/1985 | |
| WO | WO 94/15452 | * 7/1994 | .......... A01K/1/015 |
| WO | WO 96/13186 | 5/1996 | |

*Primary Examiner*—Peter M. Poon
*Assistant Examiner*—Andrea M. Valenti
(74) *Attorney, Agent, or Firm*—Lathrop & Clark LLP

(57) ABSTRACT

An improved bedding for livestock of this invention provides a bed strip for livestock having at least two elastomeric belts bonded together, one on top of the other, to form at least one bed with at least two chambers, front and rear, expandable under fluid pressure, that, once properly filled with a working volume of fluid, will each attain a convex pillow-like shape. The fluid volume in the chambers is such that when an animal steps on the rear chamber of the bed the top belt makes contact with the bottom belt to provide a stable base for the animal's foot, yet, when the animal drops to its knees on the front chamber of the bed, during the process of lying down or rising to standing, the knees are supported by a fluid cushion between the top and bottom belts. Further, the fluid volume and the modulus of elasticity of the top belt are such that when the animal is lying down, substantial portions of its body trunk will depress portions of the top belt into contact with the bottom belt to thereby displace enough fluid against other portions of the elastomeric top belt to support the more sensitive body parts, principally the knees and hocks, on a cushion of fluid extending beneath the other portions of the top belt.

36 Claims, 6 Drawing Sheets

U.S. PATENT DOCUMENTS

| | | | |
|---|---|---|---|
| 4,247,963 A | | 2/1981 | Reddi |
| 4,389,742 A | * | 6/1983 | DeWitt .......................... 5/654 |
| 4,405,129 A | * | 9/1983 | Stuckey ...................... 482/112 |
| 4,459,714 A | | 7/1984 | Lin |
| 4,491,089 A | | 1/1985 | Kelly et al. |
| 4,860,395 A | | 8/1989 | Smith |
| 5,152,018 A | | 10/1992 | Lea |
| 5,195,199 A | | 3/1993 | Sereboff |
| 5,604,945 A | * | 2/1997 | Fisher et al. .................... 5/706 |
| 5,632,051 A | | 5/1997 | Stanley et al. |
| 5,642,544 A | * | 7/1997 | Munoz .......................... 5/644 |
| 5,669,092 A | | 9/1997 | Lin |
| 5,911,657 A | | 6/1999 | Meiners |
| 6,131,219 A | * | 10/2000 | Roberts ......................... 5/644 |
| 6,152,077 A | * | 11/2000 | Bristow ..................... 119/28.5 |
| 2004/0010853 A1 | * | 1/2004 | Muci et al. .................... 5/644 |

* cited by examiner

BEDDING FOR LIVESTOCK

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to bedding for livestock and more particularly to bedding using fluid to provide cushioning and support for large animals such as cows or horses.

Humans have long kept large domesticated animals for food, dairy production, transportation and recreation. Livestock that are well kept and content can produce more food and last longer as work animals. Providing comfort to these animals during rest and sleep is essential for keeping them content and productive. To that end, farmers have used bedding materials such as straw or sand for their livestock. The bedding provides a cushion for support and warmth thereby comforting the animals. However, the use of straw or sand for bedding has a serious drawback in that those materials have a tendency to retain the livestock's excreted waste products. Further, these beddings, especially sand, are moved and scattered by an animal's use such that they must be groomed or rearranged as often as every day to provide a comfortable and supportive bed for the animal. The need to groom these types of bedding every day and completely replace them for hygienic reasons every few days constitutes a high cost in labor and replacement materials for the farmer. Therefore, other types of bedding for livestock have been developed.

Flexible rubber matting and filled mattresses have emerged as bedding for livestock. The use of rubber matting under a bedding material such as straw or sand may reduce the quantity of the material used and may ease cleaning but does not eliminate the problems detailed above.

Mattresses filled with various fillers such as flaked rubber or foam have been used as bedding. However, flaked rubber filled mattresses are very heavy and difficult to move and position, and deform and deteriorate with use. Large amounts of manpower or machinery are needed to place the mattresses for use and remove the mattresses for general cleaning. In contrast, molded foam and foam filled mattresses are lighter and more easily moved, but also deform and deteriorate over time. After continual use by a heavy animal, the foam begins to retain the shape of the animal and becomes less supportive and loses its cushioning effect. In response to these shortcomings, other filled beds have been developed.

Specifically, water or fluid filled beds have been disclosed. For instance, Bristow U.S. Pat. No. 6,152,077 discloses a fluid filled bed for livestock. The Bristow patent discloses placing a flexible sheet on top of another flexible sheet. These sheets are then bonded together around the edges creating a bladder that can be filled with water. Once filled with water, the bladder takes on a convex pillow-like shape. This shape allows waste from the animals to migrate to the margins of the bed and allows the bed to be easily hosed clean. The outer surfaces of the flexible sheets are rough to provide a non-slip surface on which the livestock steps.

Further, the bladder is filled to a water pressure such that when an animal steps on the top of the bed, the animal's foot will press the top surface down to come in contact with the bottom surface supported by the underlying floor to provide stable footing for the animal. The Bristow patent further provides that the water pressure is also such that once the animal lies down, the water will support substantially all of its body parts. Thus, the Bristow patent discloses a waterbed for livestock that provides comfort to the animal and is easy to clean while eliminating the need for straw.

However, it has been found that, in practice, waterbeds for livestock constructed according to the Bristow patent have significant limitations. Large animals initially kneel down on their front knees in the process of lying down and rising to stand. At the water pressure/volume required to allow an animal's foot to easily push the bladder top surface into contact with the bottom surface and the floor for stable footing, the animal's knees will also create point loadings which will push the top surface into contact with the bottom surface and the floor when the animal drops to its knees to lay down or shifts its weight to its knees to stand up. The knees of livestock are one of the more sensitive parts of their bodies and dropping their knees down on the firm surface of the sheets against the floor may cause knee damage over time.

Also, while the Bristow patent discloses that the water pressure/volume will both provide stable footing to an animal and support substantially all of the animal's body while lying on the bed, this is often not the case in practice. If a fluid pressure is used that will actually support substantially all parts of an animal's body while lying down, the animal's foot may not easily push the top surface into contact with the bottom surface to secure stable footing. This can cause the animal, which is inherently unstable, to lose confidence in its ability to walk on the bed and dissuade the animal from using the bed. More importantly, the fluid pressure necessary to "float" substantially all parts of the animal's body can cause the animal to be unsteady and even to roll on to its back with its legs extending at an angle upward from the horizontal floor, a position from which livestock cannot recover without human intervention.

What is needed is a bed for livestock that, when filled with fluid, has the advantage of a convex shape to facilitate cleaning and contains a fluid pressure that provides a walking animal with solid footing yet cushions a kneeling animal's knees, and provides fluid support primarily for the more sensitive parts of the animal, principally the knees, hocks and udder, but stable support for the trunk of the animal, while lying down.

SUMMARY OF THE INVENTION

The bed strip for livestock of this invention provides at least two belts of textile reinforced elastomeric material bonded together, one on top of the other, to form at least one bed with at least two chambers, front and rear, expandable under fluid pressure, that, once properly filled with a working volume of fluid, will each attain a convex pillow-like shape. The fluid pressure in the chambers is such that when an animal steps on the rear chamber of the bed the top belt makes contact with the bottom belt to provide a stable base for the animal's foot, yet, when the animal drops to its knees on the front chamber of the bed, during the process of lying down, the knees are supported by a fluid cushion between the top and bottom belts. Further, the fluid pressure and the modulus of elasticity of the top belt are such that when the animal is lying down, substantial portions of its body trunk will depress portions of the top belt into stable contact with the bottom belt to thereby displace enough fluid against the elastomeric top belt to support the more sensitive body parts, principally the knees, hocks and udder, on a cushion of fluid extending beneath other portions of the top belt.

Further features and advantages of the invention will be apparent from the following detailed description when taken in conjunction with the accompanying drawings.

DESCRIPTION OF THE PREFERRED EMBODIMENTS

Figure 1:
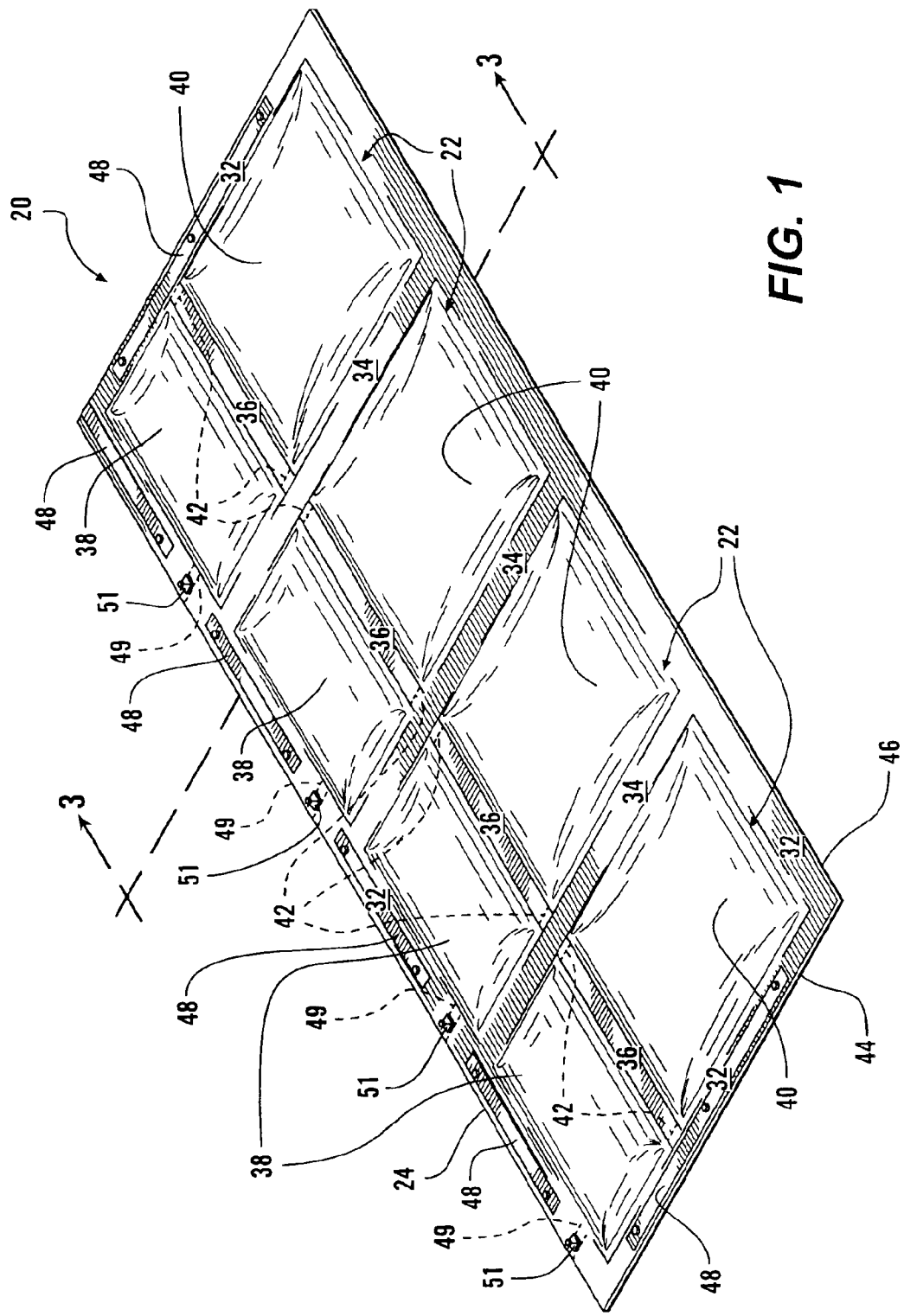
FIG. 1 is an isometric view of an embodiment of the invention showing a livestock bed strip of four beds.

Referring more particularly to FIG. 1, a rectangular bed strip 20 of four livestock beds 22 is shown. While a single livestock bed 22 may be produced, a bed strip 20 of livestock beds 22 is preferred. The bed strip 20 may be as long as necessary to accommodate as many livestock beds 22 as desired. In practice, the bed strip 20 will be sized to fit the available loafing spaces in a barn or shed, with bed strip lengths up to and exceeding 100 feet being common.

As shown in FIG. 1, the beds 22 are arranged such that the animals using the beds are parallel to each other and side-by-side. The bed strip 20 is adapted to lie on the floor of a shelter for livestock, as shown in FIG. 3–6, and may be situated so that each livestock bed 22 will be aligned with and contained within any structure (not shown) serving as a stall or space dividers for each individual animal. The preferred embodiment includes a means for securing the left and right ends and front margin of the bed strip 20 to a supporting surface, such as a floor 52 or a wall (not shown). For example, in FIG. 1 the bed strip 20 is secured to a floor (not shown) with hold down strips 48.

Figure 2:
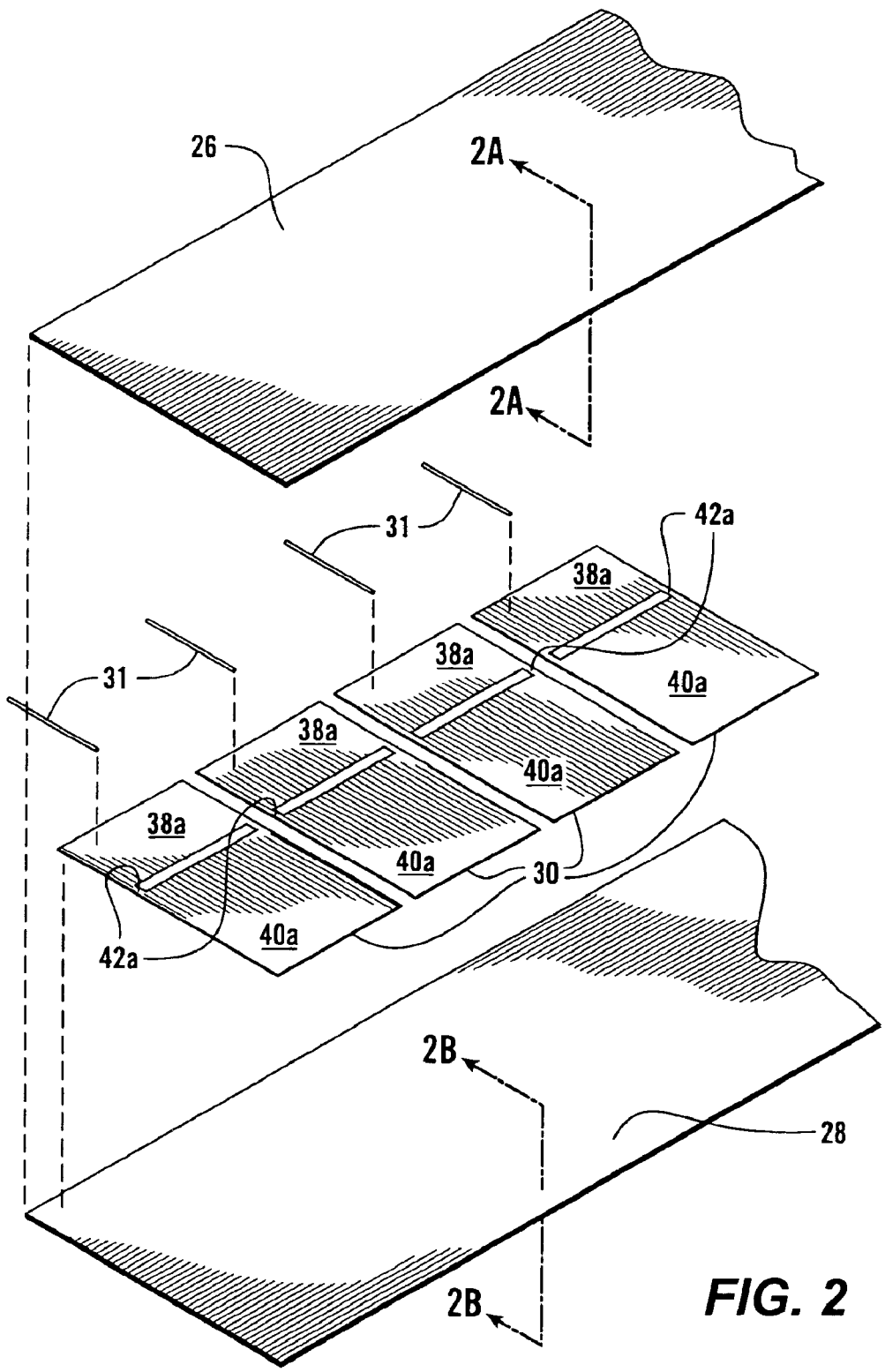
FIG. 2 is an exploded view of the embodiment of FIG. 1.

As shown in FIG. 2, the bed strip 20 is preferably made from a laminate of a top belt 26 and a bottom belt 28. The preferred embodiment of FIG. 2 also includes a separation foil 30 that will be discussed further below. As shown in FIG. 1, the belts 26 and 28 are continuously bonded together, wherever not separated by the separation foil 30, to form a fluid tight seal along the margins 32 of the bed strip 20 and along the longitudinally spaced stripes 34 between the beds 22. In a preferred embodiment the belts 26 and 28 are also bonded along a front hooves band 36 extending parallel to the front end 24 of the bed strip 20 across the width of the bed 22.

Each front hooves band 36 divides the bed 22 into a front fluid chamber 38 and a rear fluid chamber 40. Preferably, the front hooves band 36 is a discontinuously bonded strip providing orifices 42 wherever the strip is not bonded. The orifices 42 restrictively connect the fluid chambers 38 and 40 allowing fluid 54 restrictively to flow between the chambers at a rate dependent upon the pressure applied to the fluid 54. In the preferred embodiment of FIG. 1, the beds 22 have two orifices 42, one located on each end of the front hooves band 36, where the top belt 26 is not bonded to the bottom belt 28. Otherwise, the front hooves band 36 is a continuous bond forming a fluid tight seal for its entire width.

It is important to note that although the preferred embodiment shown in the drawings has two orifices 42 located at either end of front hooves band 36, the front hooves band 36 may have any desired number of breaks or discontinuities providing any number of orifices 42 between the front fluid chamber 38 and the rear fluid chamber 40. However, since it is desired to restrict fluid flow between the two chambers, two orifices of limited width will normally be adequate.

The placement of the orifices 42 may be varied as well. The use of two orifices 42, one at either end of the front hooves band 36, makes it unlikely a cow will step or lie on both orifices 42 at the same time so that one orifice 42 will normally still be open for fluid flow. On the other hand, viewing the first bed 22 in the bed strip 20 located at the left end 44 of the bed strip 20, the front hooves band 36 may connect to the bonded margin 32 on the left end 44 of the bed strip 20, extend towards the center of the bed 22, break at the center of the bed 22 forming an orifice 42 in the center of the bed 22, and then extend the rest of the width of the bed 22 connecting with the bonded stripe 34. In such an embodiment, there would only be one orifice 42, located in the center of the bed 22 and the front hooves band 36. The use of two orifices 42, as shown in FIG. 2, also simplifies the form of the separation foil 30 to include two areas 42a on either side of the separation foil for connecting the main foil areas 38a and 40a, which facilitate handling of the separation foil 30.

As shown in FIG. 1, the top belt 26 and the bottom belt 28 are bonded together to form two fluid chambers 38 and 40 that may be filled with fluid. Likewise, other preferably discontinuous bonded bands may be employed to divide the bed 22 into more than two fluid chambers. To facilitate filling with fluid, retaining the fluid and draining the fluid, a fluid passage for accessing the fluid chambers 38 and 40 is provided for each bed 22, preferably, at the front end 24 of the bed strip 20.

The fluid passages may preferably be comprised of flexible pipes or tubes 31 placed between the two belts 26 and 28 before bonding, or alternatively be simply integral passages between the two belts formed by separation or molding of the belts to prevent bonding between the belts. The tubes 31 extend from the front end 24 of the bed strip 20 through the margin 32 and into each front fluid chamber 38. The tubes 31 prevent the belts 26 and 28 from bonding at the tube 31 locations and provide openings to fill and drain the interconnected fluid chambers 38 and 40. After bonding, the tubes 31 may be removed or left between the belts 26 and 28. If the pipe or tube 31 is flexible or the pipe or tube 31 is withdrawn after the interconnected fluid chambers 38 and 40 have been filled with fluid, a clamp 51 or other device may be used to close and seal the opening 49 in the margin 32. Generally, any preferably flexible pipe, tube or other conduit device, or integral passage, may be used to provide a fluid passage for fluid ingress or egress to and from one of the interconnected chambers, and any clamp or valve apparatus may be used to selectively permit or prevent flow of fluid to and from the chambers.

Another fluid passage alternative may consist of a closeable valve of any suitable design common to inflatable and fluid filled devices embedded directly in one of the fluid chambers of each bed 22, preferably the front fluid chamber 38 which is less accessible to the animals and less subject to damage in use.

As described above, the top belt 26 is bonded to the bottom belt 28 in a fluid tight seal. The belts 26 and 28 are preferably composed of an elastomeric material and may be bonded together using any process appropriate for the type of elastomer chosen. Some possible methods of bonding include: heat welding, ultrasonic welding; vibrational welding, radio frequency welding, the use of adhesives or solvents and vulcanization. Elastomeric materials were chosen to provide elasticity to the top belt 26 so that it may expand under fluid pressure to provide a convex pillow-like shape, yet return to a flat belt-like state when the fluid is drained. The material for the bottom belt 28 is preferably chosen for ease of fluid-tight bonding to the top belt 26, such as by vulcanization.

In the preferred embodiment of FIGS. 1 and 2, the belts 26 and 28 consist of plies of natural rubber and substrates of loom woven fabrics made from synthetic filament fibers. The belts are manufactured using standard belting technology. In one exemplary embodiment, the bottom belt 28, as best shown in FIG. 2B, has at least one ply of a polyester loom woven fabric 28a having a high modulus of elasticity to resist stretching and impact abuse in both longitudinal and transverse directions. The high modulus of elasticity limits the distortion of the bottom belt 28 to thereby keep the bottom belt 28 flat on the floor 52 when the bed is filled with fluid. The at least one ply of polyester 28a is sandwiched between two plies of natural rubber to ensure a fluid tight seal when bonded. The bottom ply of rubber 28b preferably contains additives or has a coating that renders the bottom belt 28 resistant to water, acid, alkali, animal urine and other fluids found in an animal enclosure. The top ply 28c of the bottom belt 28 is preferably formed of a bonding rubber containing finer particle sized fillers and closer molecular structure to more easily bond to the fabric ply and the bottom rubber ply, and to be more fluid tight.

Figure 2A:
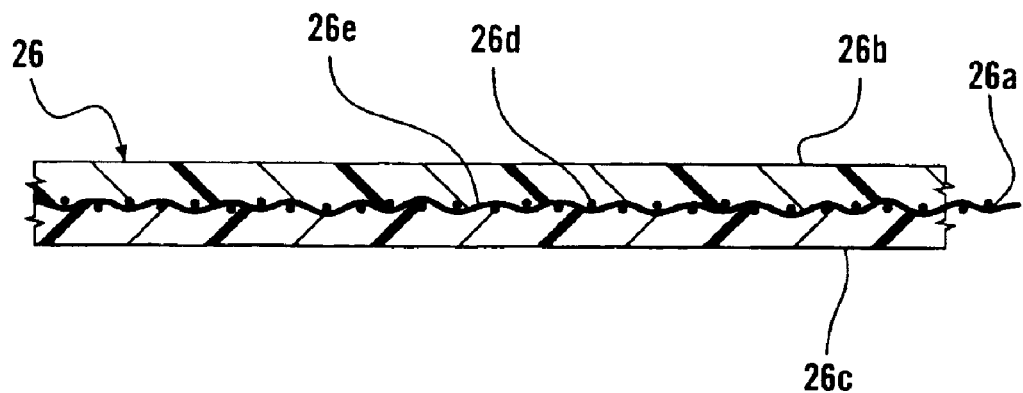
FIG. 2A is a partial enlarged schematic cross-sectional view of the top belt of a livestock bed strip taken alone section line 2A—2A of FIG. 2.
Figure 2B:
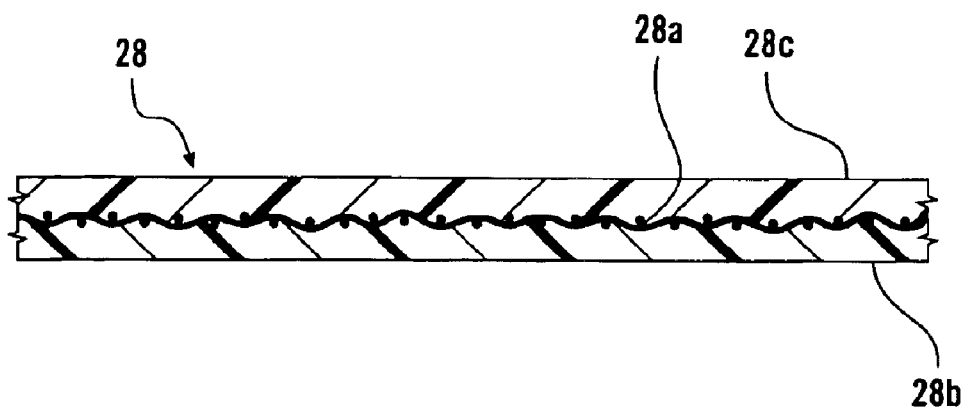
FIG. 2B is a partial enlarged schematic cross-sectional view of the bottom belt of a livestock bed strip taken alone section line 2B—2B of FIG. 2.

The top belt 26 of the exemplary embodiment, as best shown in FIG. 2A, has one ply of a woven mesh material 26a having a nylon weft yarn 26d with a modulus of elasticity less than that of the polyester used in the warp yarn 26e, and in the polyester fabric of the preferred bottom belt 28, such that the top belt 26 may expand under fluid pressure into a convex pillow-like shape. The nylon weft/polyester warp ply 26a preferably has a length to width (warp/weft) strength ratio of at least 2 to 1 to allow the nylon weft yarns 26d running the width of the belt (length of the bed 22) to stretch into convex shape while the polyester warp yarns 26e in the length direction (width of the bed 22) assist the bottom belt 28 in limiting distortion. The nylon/polyester ply 26a is preferably sandwiched between two plies of natural rubber. The top ply 26b of natural rubber preferably contains additives or has a coating that renders the top belt 26 resistant to water, acid, alkali, ozone, bacteria, animal urine and other fluids found in an animal enclosure, and is preferably formulated to resist bacteria, mold and mildew. Further, the preferred top rubber ply 26b is preferably embossed in a uniform manner. Preferably, it is embossed with interstices of not less than approximately 0.0010 inches and not more than approximately 0.0030 inches to provide a low co-efficient of friction against the animal's skin so as not to abrade the hair or cause irritation to the animal, while maintaining a surface that is suitable for the animal to walk on when wet and have no substantial foot slippage. The bottom ply 26c of the top belt 26 is preferably formed of a bonding rubber similar to the top bonding rubber ply 28c of the bottom belt 28, to more easily bond to the nylon/polyester 26a ply and the top ply 26b, as well as to the top bonding rubber ply 28c of the bottom belt 28 to provide a more fluid impervious bond between the top and bottom belts 26 and 28.

The belts 26 and 28 are preferably heat pressed together with sheets of separation foil 30 between them as shown in FIG. 2. The separation foil 30 is preferably made of a thin material, such as Teflon or Mylar, having a melting point greater than the temperature required to heat press the belts 26 and 28 together. The separation foil 30 prevents the two belts 26 and 28 from heat bonding at points where the foil 30 is in separating contact with the belts 26 and 28. In order to form the fluid chambers 38 and 40 and the orifices 42, the separation foils 30 have a preferred size and shape to allow the belts 26 and 28 to bond along the margins 32, the stripes 34 between beds 22 and the front hooves bands 36 while the belts 26 and 28 are not bonded in separation areas 38a, 40a and 42a, as shown in FIG. 2.

It is important to note that the separation foils 30 may be cut to any size and shape to form any number of different sized and shaped fluid chambers, orifices, and beds. Additionally, the belts 26 and 28, while preferably rectangular, may be any shape and size adequate for the purposes of the invention.

Preferably, as shown in FIGS. 1 and 2, the length of a bed 22 from front end 24 to rear end 46 is six feet and the bed 22 is four feet wide for use by large dairy cows, such as Holstein cows. The margins 32 at the front end 24 and the rear end 46 of the bed strip 20 are preferably six inches in length while the margins 32 at the left end 44 and the right end 50 of the bed strip 20 are four inches. The stripe 34 between beds 22 is preferably eight inches wide. If the floor 52 area upon which the bed 22 is placed is shorter than six feet, the margins 32 at the front end 24 and the rear end 46 can be trimmed and or rolled up a front edge or down and over a rear edge of the floor 52 area to fit the available space.

The front hooves band 36 is preferably located about a third of the length of the bed 22 from the front end 24 of the bed strip 20, and has a front to rear length sufficient to accommodate the size of an animal's hoof. In the embodiment of FIGS. 1 and 2, the front hooves band 36 is about three inches in length and extends thirty-six inches across the width of the bed 22 leaving two inches on either side of the band 36 for the orifices 42.

The dimensions given for the preferred embodiment are based on the use of the beds 22 by large dairy cows. These dimensions may be changed to accommodate other types and sizes of livestock. For example, in addition to the preferred bed width of 48 inches, selected bed widths of 24 to 66 inches are contemplated to accommodate different sized animals or provide more width per animal, if desired.

For purposes of this disclosure the beds 22 are considered oriented the same way as the bed strip 20 such that the front end of the beds corresponds to the front end 24 of the bed strip 20 and the left side of the bed corresponds with the left end 44 of the bed strip 20 and so forth. However, the dimension corresponding to the length of the beds 22 is perpendicular to the dimension corresponding to the length of the bed strip 20. The length of the bed 22 is measured from the front end 24 of the bed strip 20 to the rear end 46 of the bed strip 20, whereas the length of the bed strip 20 is measured from the left end 44 of the bed strip 20 to the right end 50 of the bed strip 20. Similarly, the width dimension of the bed 22 is perpendicular to the width dimension of the bed strip 20.

The following description of the use of this invention centers on the use of the bed 22 by a cow 56. It is understood that the bed 22 functions similarly for any type of livestock with corresponding adjustments in the dimensions of the bed 22 to accommodate animal size differences.

Figure 3:
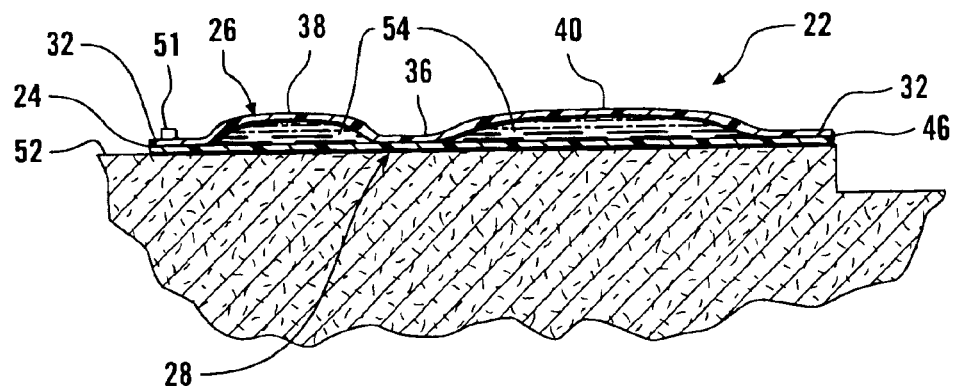
FIG. 3 is a cross sectional view of the livestock bed strip of FIG. 1, taken along section line 3—3 thereof.

FIGS. 3–7 show a cow 56 using the bed 22 of this invention. FIG. 3 shows a cross-sectional side view of a fluid filled bed 22 before use by a cow 56. The bottom belt 28 remains flat on the floor 52 while the top belt 26 expands upwards into a convex pillow-like shape in both the front and rear fluid chambers 38 and 40 due to the presence of the fluid 54 under pressure. Please note that the belt thickness and the expansion of the fluid chambers 38 and 40 are not to scale and are shown in exaggerated form in FIGS. 3–6 to more clearly show the movements taking place. FIGS. 3–6 do not detail the fabric plies 26a and 28a shown in the more detailed partial cross-sectional views of FIGS. 2A and 2B.

Any liquid fluid 54 may be used to expand the fluid chambers 38 and 40. The preferred embodiment utilizes tap water as the fluid 54. However, other appropriate liquids may be used. For example, salt water or other anti-freeze liquid may be employed for beds operated in temperatures which sometimes go below freezing.

Further, the beds 22 of this invention function best as described, when they contain a preferred working volume of fluid 54, which depends on the dimensions and materials of the beds 22 and the size and type of animal. For the preferred beds disclosed herein of 48 inches width and 72 inches length overall dimensions, the preferred volume of liquid per bed is approximately 14 gallons. This volume of liquid will cause the bed to perform as described below for an average large dairy cow. In most dairy barns, the resting areas are free choice with selection based on convenience and availability. Thus a given bed will likely be used from time to time by every animal in that section of the barn.

Figure 4:
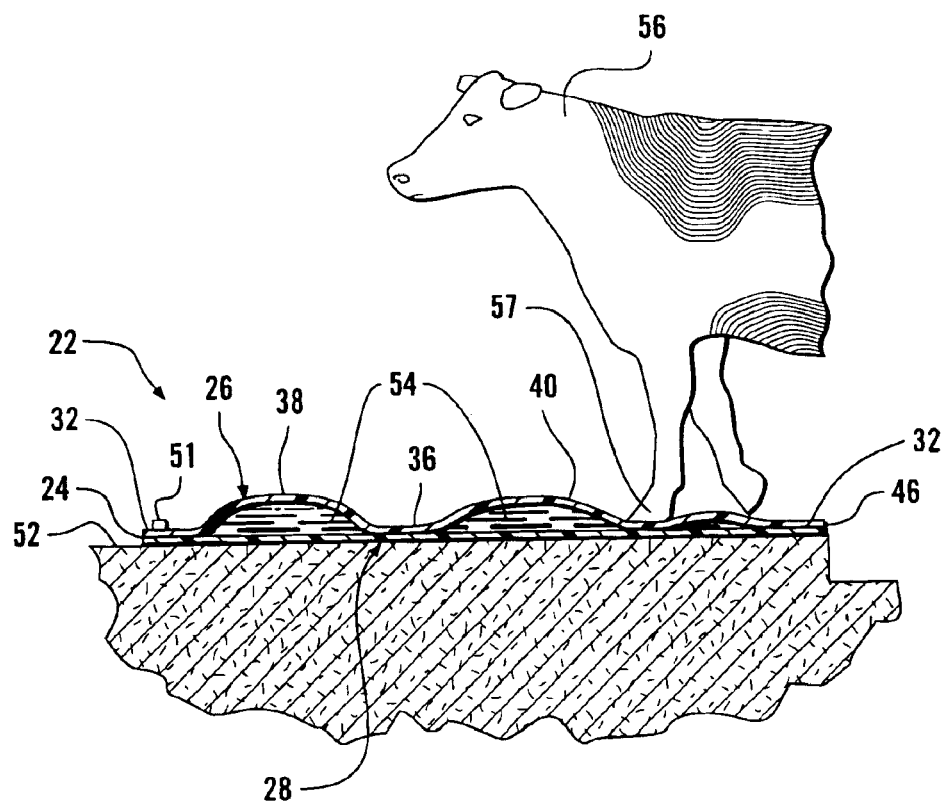
FIG. 4 is the same view as FIG. 3 showing a cow stepping onto the rear chamber of a bed.

As shown in FIG. 4, when a cow 56 steps on to the rear fluid chamber 40, the cow's weight bearing foot 56 forces the top belt 26 into contact with the bottom belt 28 which, through the support of the floor 52, provides the cow 56 with stable footing. Further, the pressure due to the weight of the cow 56 stepping on the rear fluid chamber 40 forces fluid 54 through orifices 42 into the front fluid chamber 38, thereby increasing its size and buoyancy.

Figure 5:
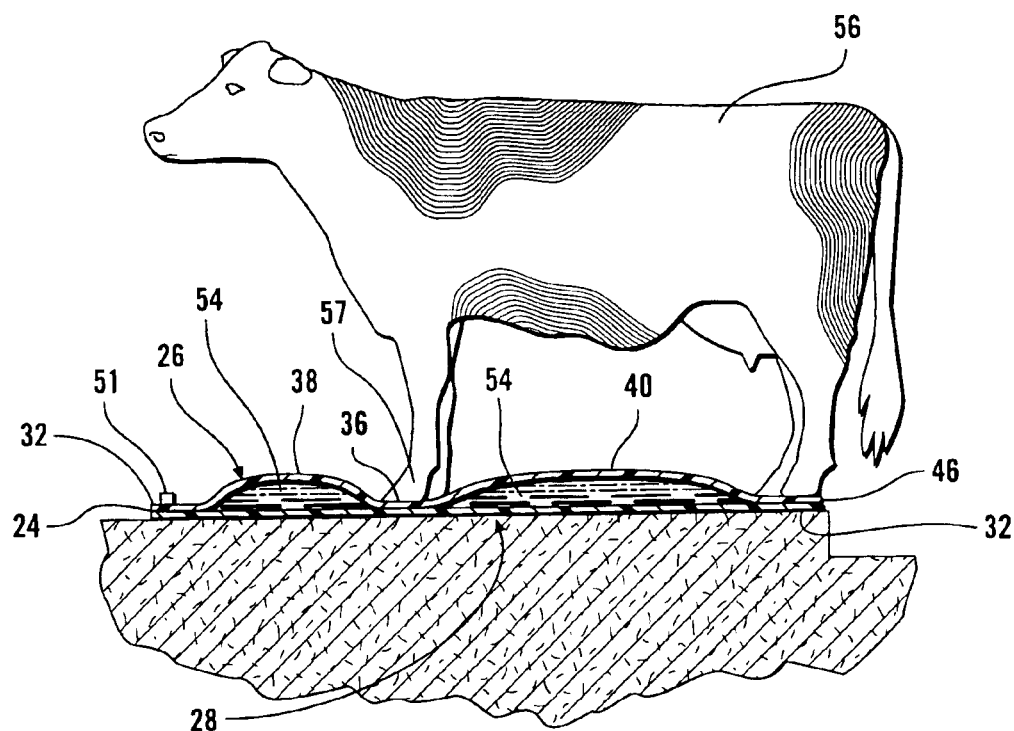
FIG. 5 is the same view as FIG. 3 showing a cow in a standing position in preparation to lie down on a bed.

In FIG. 5 the cow 56 has stepped forward on the bed 22 such that the cow's front hooves are placed on the front hooves band 36. The front hooves band 36 is continuously bonded in this area of the bed 22 and, therefore, is generally flat and supported by the floor 52, providing the cow 56 a stable base for standing and from which to lie down. A cow 56 using the livestock bed of this invention will quickly learn to stand with its front hooves placed on the front hooves band 36 and its rear hooves on the margin 32 of the rear end 46 of the bed strip 20, as these areas provide a completely stable base with no tendency to float the animal's feet as the animal stands, steps and shifts position. Cows will frequently stand for extended periods on the front hooves band 36 and rear margin 32 as they chew their cuds and prepare themselves to lie down.

Figure 6:
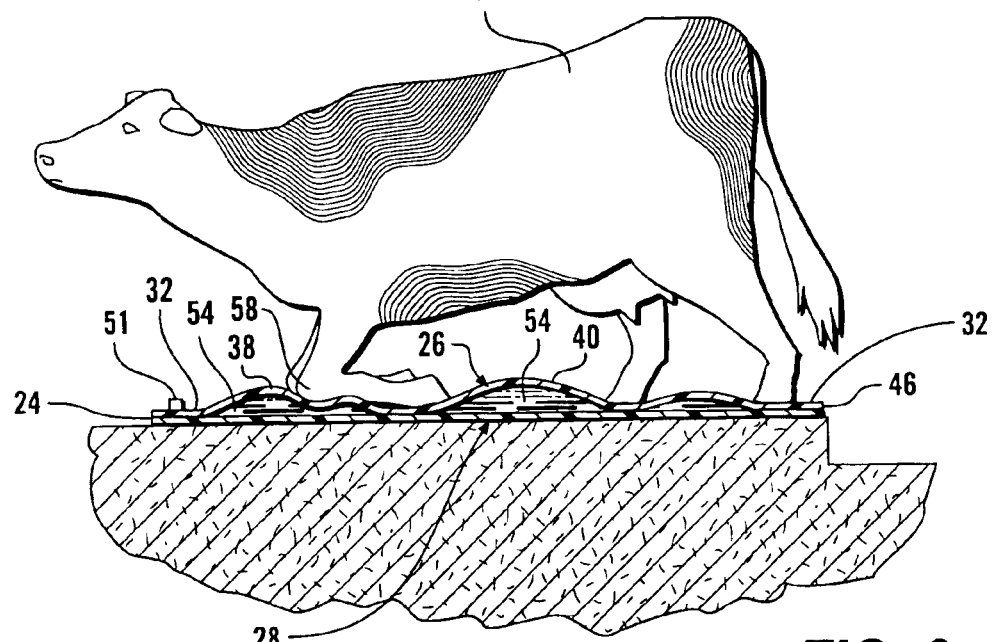
FIG. 6 is the same view as FIG. 3 showing a cow kneeling on the front chamber of a bed during the process of lying down.

FIG. 6 shows the cow 56 kneeling on the front bladder 38. In the process of lying down, a cow 56 first drops down onto its front knees and legs, which is sometimes referred to herein as kneeling. As shown in FIG. 6, the front fluid chamber 38 has an enclosed fluid content that acts as a cushion to support and protect the cow's knees 58. In kneeling, the cow 56 will deform the front fluid chamber 38, but unlike standing on the larger rear fluid chamber 40, the point loadings of the cow's knees 58 do not normally force the top belt 26 into contact with the bottom belt 28 and some fluid cushion remains between the top and bottom belts 26 and 28. The fluid 54 remaining between the top belt 26 and the bottom belt 28 supplies a softer support for the cow 56 to kneel on than a hard floor 52. Before fully lying down, the cow then usually advances its rear feet forward from the margin 32 onto the rear fluid chamber 40, and usually to one side thereof, as shown for one foot in FIG. 6, so that the rear feet are near the position shown in FIG. 7, before the cow drops its heavy rear body portion onto the bed 22. This movement of the cow's rear feet onto the rear fluid chamber 40 both positions the cow to drop onto its rear side, and also counteracts the knee pressure of the cow on the front fluid chamber 38 to minimize fluid flow from the front fluid chamber 28 to the rear fluid chamber 40.

Figure 7:
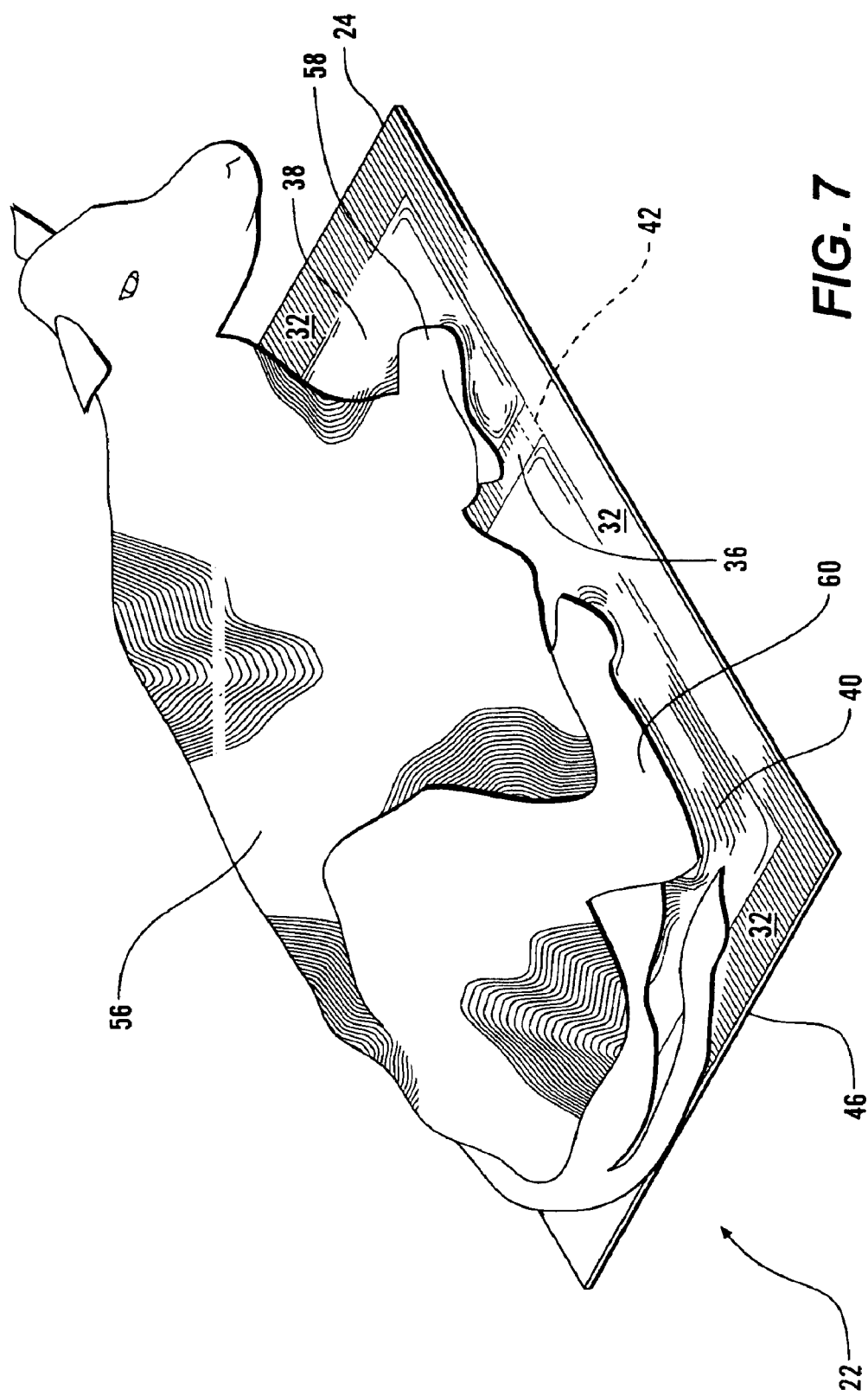
FIG. 7 is an isometric view of a single livestock bed of the invention showing a cow lying on the bed.

A cow 56 will lie mostly on its side, as shown in FIG. 7, with its legs and udder extending to one side. Once lying on the bed 22, a substantial portion of the body trunk of the cow 56 will force an underlying portion of the top belt 26 into contact with the bottom belt 28 to provide a stable support for the main weight of the cow. The heavy body trunk of the cow 56 will displace fluid 54 from beneath the top belt 26 portion under the trunk of the cow 56 into other portions of the fluid chambers 38 and 40, such that the fluid 54 remaining between the belts 26 and 28 will support the sensitive areas of the cow 56, including the knees 58 and hocks 60, and the udder. In the case of an incompressible liquid fluid, such as water or salt water, the displacement of liquid by the weight of the cow 56 on portions of the top belt 26 will cause expansion of other portions of the top belt 26, to accommodate the enclosed liquid 54 and support the less heavy sensitive areas of the cow that are not normally positioned directly beneath the main trunk of the cow 56.

While natural rubber is the preferred elastomeric material for the belts 26 and 28, any other suitably elastomeric material or combination of elastomeric materials currently known or to be developed in the future may be used, including by way of example only, synthetic rubber, polyurethane, polyvinylchloride, olefin low density, polyethylene, and acetate vinyl alcohol.

It is understood that the invention is not limited to the particular construction and arrangement of parts herein illustrated and described, but embraces all such modified forms thereof as come within the scope of the following claims.

What is claimed is:

1. A bed strip for livestock comprising:
   a top belt;
   a bottom belt, said belts having a front end, a rear end, a right end and a left end, wherein said bottom belt is bonded by a fluid tight seal to said top belt along the margins of said belts and along at least one longitudinally spaced stripe extending from said front end margin to said rear end margin to define at least two fluid tight beds,
   at least one bed the bed strip having a left side and a right side;
   said at least one bed having a band extending transversely from said left side to said right side of said at least one bed, said band being located at approximately one-third the length of said at least one bed from the front end thereof, said band dimensioned having a front to rear length sufficient to accommodate the size of an animal's hoof to support an animal's hooves in a stable supported relation, wherein said band is defined by a discontinuous fluid tight bond between said bottom belt and said top belt such that said band divides said at least one bed into an expandable front fluid chamber and an expandable rear fluid chamber, said front fluid chamber having a surface area of sufficient size to receive and support the front knees of an animal when the animal lays down from a standing position in which the animal's front hooves are supported by said band, said rear fluid chamber being interconnected to said front fluid chamber through at least one orifice defined by a discontinuity in said band; and said fluid chamber being expandable to contain a working volume of substantially incompressible fluid such that the portions of said top belt that are not bonded to said bottom belt forming said front and rear fluid chambers will elastically assume convex pillow-like shapes such that the point loading of a standing animal's foot on said rear fluid chamber will press said top belt into stable supporting contact with said bottom belt, whereas, when the animal drops to its knees on the front fluid chamber, the animal's knees will be cushioned and separated from said bottom belt by fluid between said belts.

2. The bed strip for livestock of claim 1, wherein when the animal lies down on said at least one bed, the knees and hocks of the animal lying on said fluid chambers will be supported above said bottom belt by fluid between said top and bottom belts.

3. The bed strip for livestock of claim 1, wherein when the animal lies down on said at least one bed, substantial portions of the animal's body trunk will press portions of said top belt into stable contact with said bottom belt to thereby displace fluid from beneath the top belt portion under the animal's body trunk into portions of the fluid chambers supporting the udder, knees and hocks of the animal.

4. The bed strip for livestock of claim 1, wherein said top and bottom belts are comprised of an elastomeric material.

5. The bed strip for livestock of claim 1, wherein said top belt is comprised of a laminate having at least one first ply comprised of an elastomeric material and at least one second ply comprised of a material having a modulus of elasticity greater than the modulus of elasticity of said elastomeric material.

6. The bed strip for livestock of claim 5, wherein said at least one second ply is comprised of a material having a greater modulus of elasticity in a direction generally parallel to said front and rear ends of said belts, than in a direction generally parallel to said right and left ends of said belts.

7. The bed strip for livestock of claim 5, wherein said at least one second ply is comprised of a loom woven fabric of synthetic filament fibers having polyester warp fibers extending in a direction generally parallel to said front and rear ends of said belts and nylon weft fibers extending in a direction generally parallel to said right and left ends of said belts.

8. The bed strip for livestock of claim 5, wherein said at least one second ply is comprised of a material having a modulus of elasticity in a direction generally parallel to said front and rear ends of said belts that is at least twice the modulus of elasticity of said material in a direction generally parallel to said right and left ends of said belts.

9. The bed strip for livestock of claim 8, wherein said at least one second ply is comprised of a Nylon material.

10. The bed strip for livestock of claim 5, wherein said at least one first ply is comprised of natural rubber.

11. The bed strip for livestock of claim 1, wherein said top belt is a laminate comprising:

a first ply of natural rubber formulated to easily bond to other materials and be substantially fluid impervious;

at least one second ply comprised of a material having a modulus of elasticity greater than the modulus of elasticity of said first ply, said material having a greater modulus of elasticity in a direction generally parallel to said front and rear ends of said belts, than in a direction generally parallel to said right and left ends of said belts, said at least one second ply being bonded on top of said first bottom ply; and a third ply comprised of natural rubber formulated to resist chemicals and fluids normally found in an animal enclosure, said third ply being bonded on top of said at least one second ply.

12. The bed strip for livestock of claim 1, wherein said bottom belt is comprised of a material having a modulus of elasticity greater than the modulus of elasticity of the material comprising said top belt.

13. The bed strip for livestock of claim 12, wherein said bottom belt is comprised of a laminate having at least one first ply comprised of an elastomeric material and at least one second ply comprised of a material having a modulus of elasticity greater than the modulus of elasticity of said elastomeric material.

14. The bed strip for livestock of claim 13, wherein said at least one second ply is comprised of a loom woven fabric of synthetic filament fibers.

15. The bed strip for livestock of claim 14, wherein said at least one second ply is comprised of a polyester fabric.

16. The bed strip for livestock of claim 1 wherein said bottom belt is a laminate comprising:

a first ply comprised of natural rubber adapted to resist chemicals and fluids normally found in an animal enclosure;

at least one second ply comprised of a loom woven synthetic filament fiber fabric having a modulus of elasticity greater than the modulus of elasticity of said top belt, said at least one second ply being bonded on top of said first ply; and a third ply comprised of natural rubber bonded on top of said at least one second ply.

17. The bed strip for livestock of claim 16, wherein said at least one second middle ply is comprised of a polyester fabric.

18. The bed strip for livestock of claim 1, wherein said at least one bed contains fluid.

19. The bed strip for livestock of claim 18, wherein said fluid is comprised of a liquid that will remain a liquid below freezing operating temperatures of said bed strip.

20. The bed strip for livestock of claim 18, wherein said fluid is comprised of water.

21. The bed strip for livestock of claim 1, further comprising a fluid passage for accessing at least one fluid chamber of at least one said bed to allow the fluid chamber of at least said one bed to be filled with fluid.

22. The bed strip for livestock of claim 21, wherein said fluid passage comprises a tube extending between said top and bottom belts from a margin of said bed strip into at least one interconnected fluid chamber of said at least one fluid tight bed.

23. The bed strip for livestock of claim 22, wherein said tube is flexible, and further comprising a clamp for forcing said top and bottom belts together on either side of said tube to prevent fluid flow through or around said tube.

24. The bed for livestock of claim 21 further comprising a closure means for retaining the fluid in said fluid chambers.

25. The bed strip for livestock of claim 1 further comprising a means for securing said bed strip to a supporting structure.

26. The bed strip for livestock of claim 1, wherein said bed strip is comprised of at least one hold down strip to thereby secure said bed strip to a supporting structure.

27. The bed strip for livestock of claim 1 further comprising a plurality of said longitudinally spaced stripes dividing said bed strip into a plurality of said fluid tight beds.

28. The bed strip for livestock of claim 1, wherein the upper surface of the top belt is embossed with interstices of between about 0.0010 inches and 0.0030 inches to provide a low coefficient of friction against an animal's skin, while maintaining a surface on which the animal may walk when the surface is wet without substantial foot slippage.

29. The bed strip for livestock of claim 1, wherein separation foil material is interposed between said top belt and said bottom belt within the dimensions of said front and rear fluid chambers and said at least one orifice in which said belts are not bonded together.

30. The bed strip for livestock of claim 1, including:
a plurality of separation foils interposed between said top and bottom belts, said separation foils having a surface area smaller than the surface area of said top and bottom belts such that said separation foils prevent said top belt from bonding to said bottom belt within areas wherein said separation foils are interposed, said separation foils being positioned between said top and bottom belts such that the margins of said top and bottom belts may be bonded together in fluid tight relation by heat and pressure, and separation foils being longitudinally spaced such that said top and bottom belts bond in the stripes between said separation foils to thereby form a plurality of beds, each such bed consisting of areas in which said top and bottom belts are not bonded surrounded by a continuous area of fluid tight bond, thereby forming a plurality of expandable fluid chambers that may be filled with fluid, said separation foils having a generally rectangular shape and having such portions removed therefrom to allow a discontinuous band of bonded material extending generally parallel to said front and rear ends of said belts and extending the width of said beds to thereby divide said fluid chambers into a plurality of restrictively connected front fluid chambers and rear fluid chambers;
a fluid passage for accessing at least one of said front and rear fluid chambers to thereby fill both of said fluid chambers with fluid; and
a closure for said fluid passage to selectively permit and prevent fluid flow to and from said fluid chambers.

31. A bed strip for livestock comprising:
a resilient body having a top belt and bottom belt wherein the belts are selectively bonded together in fluid tight relation to define at least one bed, said at least one bed having a transverse band located at approximately one-third of the length of said at least one bed from a front end thereof, said band defined by a fluid tight bond between said bottom belt and said top belt to divide the bed into an expandable front fluid chamber and an expandable rear fluid chamber of greater dimensions than said front fluid chamber, said belts not being bonded together within the dimensions of said fluid chambers, said band dimensioned having a front to rear length sufficient to accommodate the size of an animal's hoof to support an animal's front hooves in a stable supported relation, said rear said rear fluid chamber being interconnected to said front fluid chamber by an orifice which permits restricted fluid flow between said chambers, said fluid chambers being expandable to contain a working volume of substantially incompressible fluid such that the portions of said top belt that are not bonded to said bottom belt will elastically assume convex pillow-like shapes and the point loading of a foot of a standing animal on said rear fluid chamber will press said top belt into stable supporting contact with said bottom belt, whereas, when the animal drops to its knees on the front fluid chamber, the animal's knees will be cushioned and separated from said bottom belt by fluid between said belts; a fluid passage for accessing at least one fluid chamber of said bed to allow the fluid chamber of said bed to be filled, said fluid passage extending between said top and bottom belts from a margin of said bed strip into at least one interconnected fluid chamber of said bed.

32. The bed strip for livestock of claim 31, wherein the modulus of elasticity of the top belt is such that when the fluid chambers contain a working volume of substantially incompressible fluid, and the animal is lying down, substantial portions of its body trunk will depress portions of the top belt into stable contact with the bottom belt to thereby displace enough fluid against other portions of the top belt to support the knees and hocks of the animal on a cushion of fluid extending beneath the other portions of the top belt.

33. The bed strip of claim 31, wherein the selective bonding together of said belts define a plurality of fluid tight beds extending along the length of the said strip in side-by-side relation.

34. The bed strip for livestock of claim 31, wherein separation foil material is interposed between said top belt and said bottom belt within the dimensions of said fluid chambers and said orifice in which said belts are not bonded together.

35. The bed strip for livestock of claim 31, including:
a plurality of separation foils interposed between said top and bottom belts, said separation foils having a surface area smaller than the surface area of said top and bottom belts such that said separation foils prevent said top belt from bonding to said bottom belt within areas wherein said separation foils are interposed, said separation foils being positioned between said top and bottom belts such that the margins of said top and bottom belts may be bonded together in fluid tight relation by heat and pressure, and separation foils being longitudinally spaced such that said top and bottom belts bond in the stripes between said separation foils to thereby form a plurality of beds, each such bed consisting of areas in which said top and bottom belts are not bonded surrounded by a continuous area of fluid tight bond, thereby forming a plurality of expandable fluid chambers that may be filled with fluid, said separation foils having a generally rectangular shape and having such portions removed therefrom to allow a discontinuous band of bonded material extending generally parallel to said front and rear ends of said belts and extending the width of said beds to thereby divide said fluid chambers into a plurality of restrictively connected front fluid chambers and rear fluid chambers;

said fluid passage accesses at least one of said front and rear fluid chambers to thereby fill both of said fluid chambers with fluid; and a closure for said fluid passage to selectively permit and prevent fluid flow to and from said fluid chambers.

36. A bed strip for livestock comprising:

a top belt and a bottom belt, said belts each having a front end, a rear end, a right end and a left end, wherein said bottom belt is bonded by a fluid tight seal to said top belt along the margins of said belts and along at least one longitudinally spaced stripe extending from said front end margin to said rear end margin, wherein said at least one stripe divides said bed strip into at least two fluid tight beds, said top belt being a laminate comprising a first ply of natural rubber formulated to easily bond to other materials and be substantially fluid impervious, at least one second ply comprised of a material having a modulus of elasticity greater than the modulus of elasticity of said first ply and being further comprised of woven synthetic filament fibers having polyester warp fibers extending generally parallel to said front and rear ends of said belts and nylon weft fibers extending generally perpendicular to said front and rear ends of said belts, and wherein the warp/weft modulus of elasticity is at least two to one, said at least one second ply being bonded on top of said first ply, and a third ply comprised of natural rubber formulated to resist chemicals and fluids normally found in an animal enclosure, said third ply being bonded on top of said at least one second ply;

at least one bed of the bed strip having a left side and a right side;

said at least one bed having a band extending from said left side to said right side of said at least one bed, wherein said band is defined by a discontinuous fluid tight bond between said bottom belt and said top belt such that said band divides said at least one bed into an expandable front fluid chamber and an expandable rear fluid chamber, said rear fluid chamber being interconnected to said front fluid chamber through at least one orifice defined by a discontinuity in said band; and said fluid chambers being expandable to contain a working volume of fluid such that the portions of said top belt that are not bonded to said bottom belt forming said front and rear fluid chambers will elastically assume convex pillow-like shapes such that the point loading of a standing animal's foot on said rear fluid chamber will press said top belt into stable supporting contact with said bottom belt, whereas, when the animal drops to its knees on the front fluid chamber, the animal's knees will be cushioned and separated from said bottom belt by fluid between said belts.

* * * * *